US012693457B2

(12) United States Patent
Namai et al.

(10) Patent No.: US 12,693,457 B2
(45) Date of Patent: Jul. 28, 2026

(54) BLACK LIGHT SHIELDING MEMBER

(71) Applicant: SOMAR CORPORATION, Tokyo (JP)

(72) Inventors: Hiroshi Namai, Tokyo (JP); Naoki Sakazume, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 404 days.

(21) Appl. No.: 18/254,535

(22) PCT Filed: Nov. 24, 2021

(86) PCT No.: PCT/JP2021/042871
§ 371 (c)(1),
(2) Date: May 25, 2023

(87) PCT Pub. No.: WO2022/113960
PCT Pub. Date: Jun. 2, 2022

(65) Prior Publication Data
US 2024/0004108 A1    Jan. 4, 2024

(30) Foreign Application Priority Data

Nov. 25, 2020    (JP) .................................. 2020-195279

(51) Int. Cl.
*G02B 5/00* (2006.01)
*G02B 1/04* (2006.01)
*G02B 1/111* (2015.01)

(52) U.S. Cl.
CPC .............. *G02B 5/003* (2013.01); *G02B 1/04* (2013.01); *G02B 1/111* (2013.01)

(58) Field of Classification Search
CPC .......... G02B 5/003; G02B 1/04; G02B 1/111; G02B 5/00
See application file for complete search history.

(56) References Cited

U.S. PATENT DOCUMENTS 5,948,481 A * 9/1999 Yan ......................... G02B 1/111
106/287.19
2014/0016203 A1 1/2014 Toshima et al.
(Continued)

FOREIGN PATENT DOCUMENTS

JP    2014092632 A    5/2014
JP    2014152249 A    8/2014
(Continued)

OTHER PUBLICATIONS

Examiner provided machine translation of Ichikawa, JP 2014092632 A (Year: 2014).*
(Continued)

*Primary Examiner* — Balram T Parbadia
(74) *Attorney, Agent, or Firm* — Juan Carlos A. Marquez; Marquez IP Law Office, PLLC

(57) ABSTRACT

A light shielding component with low gloss, high blackness, and excellent processability is provided. A light shielding layer (3) containing black fine particles (32), low refractive index nanoparticles (33), and a resin composition (31) is formed on at least one surface of a substrate. The average particle size of the black fine particles (32) is set to be between 0.1 μm and 50 μm, and the average particle size of the low refractive index nanoparticles (33) is set to be between 1 nm and 200 nm. Porous carbon is preferred as the black fine particles (32), while magnesium fluoride particles and silicon oxide particles are preferred as the low-refractive-index nanoparticles (33).

7 Claims, 2 Drawing Sheets

(56)          References Cited

U.S. PATENT DOCUMENTS

| | | |
|---|---|---|
| 2015/0376470 A1 | 12/2015 | Masuko et al. |
| 2016/0231563 A1* | 8/2016 | Teramoto ............... G02B 5/003 |
| 2020/0088969 A1* | 3/2020 | Nagahama ............. G02B 5/003 |
| 2020/0385501 A1 | 12/2020 | Tanaka |
| 2021/0139690 A1* | 5/2021 | Oya .................... H10F 39/8057 |

FOREIGN PATENT DOCUMENTS

| | | |
|---|---|---|
| JP | 2019101402 A | 6/2019 |
| WO | 2012132728 A1 | 10/2012 |

OTHER PUBLICATIONS

PCT International Search Report mailed Jan. 18, 2022, in corresponding PCT application PCT/JP2021/042871, 2 pages in English.

* cited by examiner (A)                                                    (B)

(A)

(B)

BLACK LIGHT SHIELDING MEMBER

FIELD OF TECHNOLOGY

The invention relates to a black light shielding component, and in more detail, relates to a black light shielding component that can be applied to optical devices such as camera units of mobile phones, etc., including smart phones.

BACKGROUND TECHNOLOGY

Generally, a light shielding component is used in the lens diaphragm, the shutter and the lens spacer of the camera.

As such a light shielding component, it is known that a black film has a specified concave and convex shape on the surface of a black polyester substrate and contains carbon black or the like as a black pigment. In the above structures, light can be effectively scattered by controlling the micro concave and convex shape of the surface of the light shielding layer, and the low gloss can be achieved by making the black pigment absorb light and reduce the reflected light. As methods for forming the concave and convex, for example, there are a method for coating a light shielding layer containing a matting agent on the surface of the substrate and a method for roughening the surface of the substrate by sandblasting or the like.

Patent document 1: The Bulletin of International Disclosure No. WO2018/052044 describes that the arithmetic mean roughness Ra of the surface of the light shielding component measured according to JIS B0601:2001 is adjusted to 0.5 μm or more by using the above methods, and a difference between the maximum peak height Rp and the maximum valley depth Rv (Rp-RV) is adjusted to less than 3. Moreover, the light shielding component with such a surface shape, even if it is thin, has excellent anti reflection performance, due to its excellent hardness and excellent tightness between the light shielding layer and the film substrate, so it can maintain excellent low gloss for a long time.

SUMMARY OF THE INVENTION

Problems to be Solved by Invention

In recent years, a high blackness shielding component for optical devices which makes the black prominent for the purpose of enhancing the sense of design has been sought. However, in the previous light shielding components, because light is scattered by the surface of the light shielding layer, it is whitish and blackness is not prominent, which is difficult to achieve both low gloss and high black. By increasing the compounded amount of black fine particles, the black property can be improved while maintaining low gloss. However, the coating film of the light shielding layer is known to easily fall off, and this reduction in processability becomes a problem.

The present invention is directed to addressing the above situations, and aims to provide a light shielding component that can achieve low gloss, high blackness and excellent processability.

Means for Solving Problems

In view of the above subjects, the inventors of the present invention has carried out in-depth research, and found that in a black light shielding component with a substrate film and a light shielding layer formed on at least one surface of the substrate film, the above problems can be solved by adding black fine particles and low refractive index nano particles to the resin composition of the light shielding layer, thus conceiving the invention. That is, the black light shielding component of the invention has a substrate and a light shielding layer formed on at least one surface of the substrate, which is characterized in that the light shielding layer contains black fine particles, low refractive index nano particles and resin composition.

The black fine particles preferably contain porous carbon.

In addition, the low refractive index nano particles preferably comprise at least one selected from magnesium fluoride particles, calcium fluoride particles, lithium fluoride particles, calcium carbonate particles, and silicon oxide (silica) particles.

Further, the low refractive index nano particles preferably contain magnesium fluoride particles and silicon oxide particles.

The low refractive index nano particles can also contain nano hollow particles.

The hollow nano particles can also contain hollow silica nano particles.

In addition, the sum of the contents of the black fine particles and low refractive index nano particles in the light shielding layer is preferably 50%-95% of the overall volume of the light shielding layer.

Further, the average particle size of the black fine particles is preferably 0.1 μm~50 μm, and the average particle size of the low refractive index nano particles is preferably 1 nm~200 nm. Compared with the total amount of the black particles and the low refractive index nano particles, The content of the low refractive index nano particles is preferably 1 volume % to 50 volume % relative to the total amount of the black fine particles and the low refractive index nano particles.

In addition, the glossiness of the surface of the black light shielding component on which the light shielding layer is formed relative to the incident light with an incidence angle of 60° is preferably 1% or less, and the L value is preferably 10 or less.

The average film thickness of the light shielding layer is preferably 1 μm~100 μm.

The Effects of the Invention

The black light shielding component of the present invention has low gloss, high blackness and excellent design, so it can be used as a camera unit of mobile phones such as smart phones. In addition, the light shielding layer of the black light shielding component of the present invention has good adhesion, such that the peeling of the light shielding layer film can be prevented even during the stamping process, and has excellent processability.

BRIEF DESCRIPTION OF ATTACHED DRAWINGS

SPECIFIC EMBODIMENTS

The embodiments of the invention will be described in detail below.

In addition, in this specification, "~" indicating the range of values indicates the range containing the values recorded as the upper limit value and the lower limit value respectively. Further, in the range of values, if the unit is only recorded for the upper limit value, it means that the unit of the lower limit value is also the same as the upper limit value.

In the range of values recorded gradually in this specification, the upper limit value or the lower limit value of a certain range of values can also be replaced by the upper limit value or lower limit value of other ranges of values recorded gradually.

In addition, in the range of values recorded in this specification, the upper limit value or the lower limit value recorded in a certain range of values can also be replaced by the values shown in the examples.

In this specification, with respect to the percentage or content of each constituent in a composition, if there is a variety of substances equivalent to each component in the composition, as long as there is no special description, it refers to the total percentage or total content of the various substances in the composition.

Figure 1:
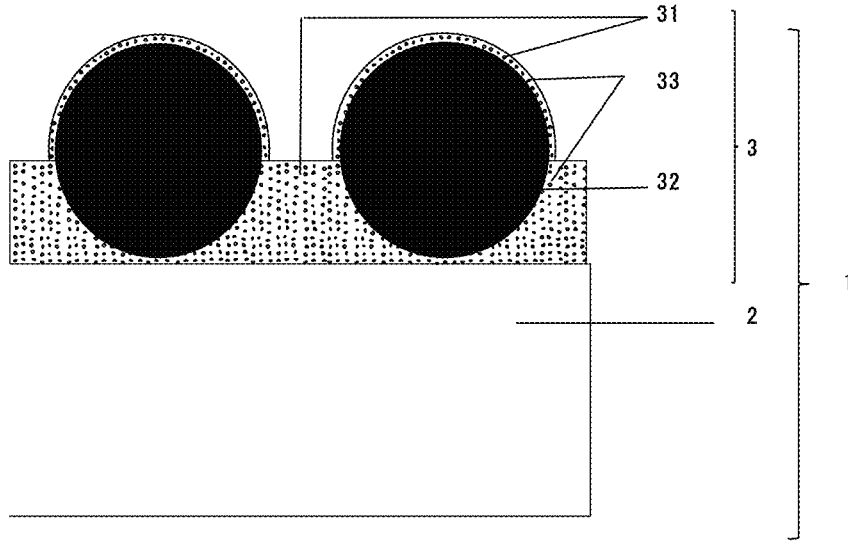
FIG. 1 is a sectional diagram showing the structures of the light shielding component according to the embodiments of the present invention.

FIG. 1 is a sectional diagram showing the structures of the black light shielding component 1 according to the embodiments of the present invention. The black light shielding component 1 of the invention has a substrate 2 and a light shielding layer 3 formed on at least one surface of the substrate 2, which is characterized in that the light shielding layer 3 contains black fine particles 32, low refractive index nano particles 33 and resin composition 31.

In the present invention, because the low refractive index nano particles 33 are dispersed in the resin composition 31, the refractive index of the light shielding layer 3 decreases, the refractive index difference between the light shielding layer 3 and the air layer ($n_d$=1.00) decreases, and the diffuse reflected light on the surface of the light shielding layer 3 decreases. Further, the diffuse reflected light is reflected and absorbed by the black fine particles, so that the light is significantly attenuated. Therefore, it is considered that in the black light shielding component 1 of the present invention, low gloss and high blackness can be achieved.

The specific material composition of the black light shielding component of the present invention will be described below.

(1) Substrate

The substrate used in the present invention is not specifically limited, and can be a transparent substrate or an opaque substrate. As the substrate material of the present invention, resin, metal, glass and so on can be used.

As the material of the substrate made of resin, for example, polyethylene, polypropylene, ethylene propylene copolymer, polyolefin such as copolymer of ethylene and α-olefin with the carbon atom number of 4 or more, polyester such as polyethylene terephthalate, polyamide such as nylon, ethylene vinyl acetate copolymer, polyvinyl chloride (PVC), other general purpose plastics such as polyvinyl acetate, engineering plastics such as polycarbonate and polyimide.

In addition, the substrate may be made of metal, such as for example gold, silver, copper, aluminum, titanium, zinc, beryllium, nickel, and tin; or the substrate may be made of an alloy such as phosphor bronze, copper nickel, copper beryllium, stainless steel, brass, duralumin.

As the substrate may also be made of glass, there is no special limit, but ultra-thin plate glass (for example G-Leaf, which is a registered trademark and is manufactured by Nippon Electric Glass Co., LTD), etc. can be used.

Among these materials, from the point of view of high strength, economy and versatility, polyethylene terephthalate with biaxial stretching is preferred. In addition, from the point of view of heat resistance, the polyimide substrate is preferred, and in the case of further requiring high heat resistance, the metal substrate composed of copper is preferred. In the case of the substrate made of resin, by kneading black dye such as carbon black and aniline black into these materials in advance, the optical concentration is adjusted to 2 or more, preferably 4 or more, so that even better light shielding properties can be obtained.

There is no special limit on the thickness of the substrate, but in the case of using the substrate made of resin, it is preferably 2 to 250 μm, and even more preferably 4 to 100 μm. By setting the thickness of the substrate to the above range, it can also be used for small, thin optical components. In addition, in the case of optical devices such as camera units for mobile phones and the like, it is preferably set to 4 μm~20 μm.

In the case of using the substrate made of metal, the thickness of the substrate is preferably 6 μm to 40 μm, in particular, in the case of optical devices such as camera units used for mobile phones and the like, it is preferably set to 10 μm to 20 μm.

In the case of using the substrate made of glass, the thickness of the substrate is preferably 5 μm~200 μm, more preferably set to 10 μm~100 μm. In addition, in the case of optical devices such as camera units used for mobile phones and the like, it is preferably set to 10 μm~35 μm.

As the substrate, a flat substrate can be used, and it is also possible to use a substrate that has been matted to the surface and has formed concaves and convexes (roughening parts). By means of the matting process, it is possible to control the concave and convex shapes of the surface of the light shielding component covered by the light shielding layer, and improve the tightness between the substrate and the light shielding layer. There is no special limit on the matting process method, and well-known methods can be used. For example, when the substrate is made of resin, methods such as the chemical etching method, blasting method, embossing method, calendering method, corona discharge method, plasma discharge method, and chemical matting method using resin and a roughening forming agent, and so on can be used. In addition, the substrate can directly contain a matting agent to form concaves and convexes on the surface of the substrate made of resin. In the above processing methods, from the point of view of ease of shape control, economy and operability, a blasting method is preferred, especially a sandblasting method.

In the sandblasting method, the surface properties can be controlled by the particle sizes of the abrasive used, the injection pressure, etc. In addition, in the embossing method, the surface properties can be controlled by adjusting the shape and pressure of the embossing roller.

On the other hand, in the case of the substrate being made of metal, it can be blackened, blast treated, etched and so on to form a concave and convex surface.

(2) Anchor Coat Layer (Fixed Layer)

Before the light shielding layer is formed on at least one surface of the substrate, the fixed layer can also be formed to improve the adhesion between the substrate and the light shielding layer. As the fixed layer, a urea resin layer, a melamine resin layer, a polyurethane resin layer, a polyester resin and so on can be used. For example, the polyurethane resin layer can be obtained by coating a solution including an active hydrogen-containing compound such as polyisocyanate and diamine, diol on the surface of the substrate and curing it. In addition, when the fixed layer is urea resin or melamine resin, it can be obtained by coating a solution containing water-soluble urea resin or water-soluble melamine resin on the surface of the substrate and curing it. Polyester resin can be obtained by coating a solution dissolved or diluted with an organic solvent (methyl ethyl ketone, toluene, etc.) on the surface of the substrate and drying it.

(3) Light Shielding Layer

The light shielding layer of the present invention contains a resin composition, black fine particles and low refractive index nano particles.

The following describes each composition.

1) Resin Composition

The resin composition is the binder of black fine particles and low refractive index nano particles. There is no special limit on the materials of resin composition, and either thermoplastic resins or thermosetting resins can be used. As specific thermosetting resins, for example, there are acrylic resin, polyurethane resin, phenolic resin, melamine resin, urea resin, diallyl phthalate resin, unsaturated polyester resin, epoxy resin, alkyd resin, etc. In addition, thermoplastic resins include for example, polyacrylate resin, polyvinyl chloride resin, butyral resin, styrene butadiene copolymer resin, etc.

From the point of view of heat resistance, moisture resistance, solvent resistance and surface hardness, a thermosetting resin is preferred. If the flexibility and the strength and toughness of the film are considered, an acrylic resin is particularly preferred among thermosetting resins. On the other hand, the thermosetting process can be omitted when the strength and toughness of the film are not required. Therefore, thermoplastic acrylic resin is preferred.

By adding a curing agent as the composition of the light shielding layer, the crosslinking of the resin composition can be promoted. As the curing agent, urea compounds having functional group, melamine compounds, isocyanate compounds, epoxy compounds, aziridine compounds, oxazoline compounds and so on can be used. Among them, isocyanate compounds are particularly preferred. Compared with 100% by mass of the resin composition, the compounded ratio of the curing agent is preferably 10% by mass to 50% by mass. By adding the curing agent in the above range, a light shielding layer with more appropriate hardness can be obtained, even in the case of sliding with other components, it can maintain the surface shape of the light shielding layer for a long time and maintain low gloss.

When the curing agent is used, a reaction catalyst can also be used at the same time to promote the reaction. As the reaction catalyst, there are for example ammonia, ammonium chloride, etc. Compared with 100% by mass of the curing agent, the compounded ratio of the reaction catalyst is preferably in the range of 0.1% by mass to 10% by mass.

2) Black Fine Particles

The black light shielding component of the present invention is characterized in that the light shielding layer contains black fine particles.

As shown in FIG. 1, a fine concave and convex shape is formed on the surface of the light shielding layer 3 by the black fine particles 32. Then, the glossiness can be reduced by scattering light on the surface of the concave and convex shape. Further, the light is absorbed by the black fine particles 32, and is repeatedly scattered and absorbed, thereby reducing the reflected light and achieving further low glossiness.

In FIG. 1, a structure is shown in which a light shielding layer 3 containing black fine particles 32 is covered on the surface of a flat substrate 2. However, as described above, it is also possible to use a substrate with a concave and convex shape formed on the surface by matting treatment.

In the present invention, in order to achieve the desired glossiness, the concave and convex shape of the surface of the light shielding layer 3 can be controlled according to existing methods. The shape of the surface of the light shielding layer 3 can be controlled by adjusting the shape of the surface of the substrate 2, the particle size, particle size distribution and content of the black fine particles 32, and the film thickness of the light shielding layer 3. In addition, it can also be controlled by adjusting the type of solvent and the concentration of solid composition during the preparation of the coating solution, and the amount of coating to the substrate. Furthermore, it can also be controlled by coating manufacturing conditions such as the coating method for the coating solution, the drying temperature, time and drying air volume and so on.

As for the average particle size of the black fine particles of the present invention, as long as the light shielding layer with the desired surface shape can be obtained, there is no special limit, but it is preferably 0.1 μm~50 μm, more preferably 1 μm~10 μm. By setting the average particle size of the black fine particles to the above range, the micro concaves and convexes can be formed on the surface and the glossiness of the light shielding layer can be further reduced.

In addition, the content of black fine particles also depends on the average particle size and particle size distribution of black fine particles, as well as the film thickness of the light shielding layer and the shape of the surface of the substrate. However, compared with 100 volume % of the light shielding layer, the content of black fine particles is preferably 25 volume % to 93 volume %, and more preferably 50 volume % to 90 volume %.

By setting the content of black fine particles to the above range, even better blackness and low gloss can be achieved.

In addition, the volume fraction (volume occupancy) of black fine particles in the light shielding layer can be converted into the area occupancy calculated by image analysis and so on based on the cross section photo of the light shielding layer.

As the black fine particles, any of the resin particles and inorganic particles can also be used. The materials of resin particles include for example, melamine resin, benzoguanamine resin, benzoguanamine/melamine/formalin condensate, acrylic resin, polyurethane resin, styrene resin, fluorine resin, silicon resin, etc. On the other hand, materials of inorganic particles include for example, silica, alumina, calcium carbonate, barium sulfate, titanium oxide (titanium dioxide), carbon, etc. They can be used separately or combined with more than two.

In addition, when non black materials are used, black fine particles can be obtained by coloring the fine particles with organic or inorganic colorants. As the specific colorants, for example, there are carbon black, aniline black, carbon nanotubes, etc.

As materials obtained by coloring like this, for example, there are composite silicon dioxide, conductive silicon dioxide, black silicon dioxide, black acrylic resin, etc.

As the composite silicon dioxide, for example, there are composite silicon dioxide obtained by synthesizing and compounding carbon black and silicon dioxide at nanometer level; as the conductive silicon dioxide, for example, there are conductive silicon dioxide obtained by coating conductive particles such as carbon black on silicon dioxide particles; as the black silicon dioxide, for example, there are natural ores containing graphite in silica. In addition, as the black acrylic resin, for example, there are acrylic copolymer and so on obtained by coloring carbon black.

In order to obtain more excellent properties, inorganic particles are preferably used as the black fine particles. As the black fine particles, by using inorganic particles, a black light shielding component with lower gloss and high black property can be obtained. As the inorganic particle materials used as the black fine particles, carbon is preferred. Porous carbon particles are particularly preferred among carbon. By using porous carbon, the following effects can be obtained compared with the case of using non porous black particles. That is, on the surface and inside of the particles, the light is repeatedly reflected and absorbed to attenuate, and on the surface and inside of the black fine particles, more low refractive nano particles can be kept, so the glossiness can be further reduced.

There is no special limit on the shapes of the black fine particles, however, if the flow characteristics of the coating solution, the coating property, the sliding characteristics of the obtained light shielding layer and so on are considered, it is preferable to use the spherical black fine particles.

3) Low Refractive Index Nano Particles

The light shielding component of the present invention is characterized in that it contains low refractive index nano particles.

Figure 2:
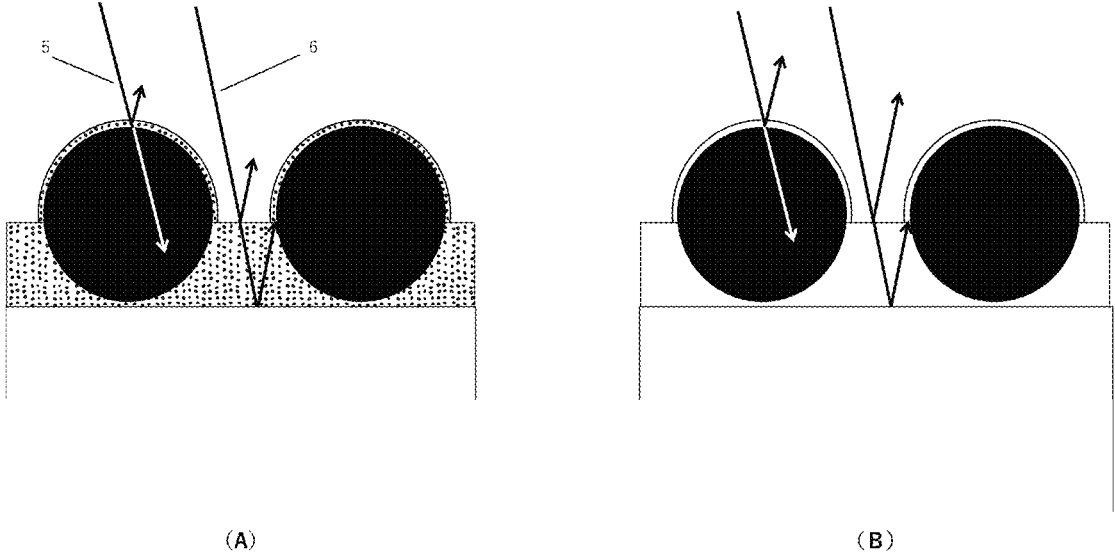
FIG. 2 is a schematic diagram (A) showing the attenuation behavior of the incident light in the light shielding component of the present invention and a schematic diagram (B) showing the attenuation behavior of the incident light in the light shielding component where the light shielding layer does not contain low refractive nano particles.

FIG. 2(A) shows the attenuation behavior of the incident light in the black light shielding component of the present invention, and FIG. 2(B) shows the attenuation behavior of the incident light in the light shielding component without low refractive index nano particles in the light shielding layer.

As shown in FIG. 2(A), in the black light shielding component of the present invention, a fine concave and convex shape is formed on the surface of the light shielding layer through the black fine particles. Here, low refractive index nano particles and black fine particles are dispersed together in the resin composition (binder resin) of the light shielding layer, and the side surface of the air layer of the black fine particles has a structure covered by the resin composition dispersed with low refractive index nano particles.

Through the resin composition with low refractive index nano particles dispersed, a portion of the incident light 5 after reaching the surface of the black fine particles is transmitted and absorbed by the black fine particles, and a portion of it becomes reflected light. Here, because the black fine particles are covered by the resin composition dispersed with low refractive index nano particles, the reflection from the resin composition surface can be suppressed. Therefore, compared with the light shielding component, in which black fine particles are covered with resin composition not containing low refractive index nano particles shown in FIG. 2(B), more light passes through the resin composition, and more light is absorbed by black fine particles. Therefore, it is considered that the reflected light can be effectively reduced.

In addition, a portion of the incident light 6 that reaches the surface of the light shielding layer, which is the interface between the air layer and the resin composition not covering black fine particles, is transmitted and a portion is reflected. Here, in the black light shielding component of the present invention, because the nano particles with low refractive index are dispersed in the resin composition, compared with the light shielding component with the resin composition without low refractive index nano particles shown in FIG. 2(B), the light reflected at the interface between the air layer and the resin composition of the light shielding layer is reduced, and the light transmitted through the resin composition of the light shielding layer is increased.

In addition, the light passing through the resin composition of the light shielding layer is reflected on the surface of the substrate as the interface between the substrate and the light shielding layer, and is absorbed by the black fine particles in the light shielding layer.

Therefore, it is considered that low gloss and high blackness can be achieved through the black light shielding component of the present invention.

Here, low refractive index nano particles refer to nano particles with refractive index 1.5 or less. The average particle size of low refractive index nano particles is preferably 1 nm~200 nm, more preferably 5 nm~150 nm, further preferably 10 nm~100 nm, most preferably 20 nm~80 nm.

By setting the refractive index and average particle size of low refractive index nano particles to the above ranges, the refractive index of the light shielding layer can be reduced more effectively. Therefore, the blackness can be further improved.

In the conventional light shielding layer containing carbon nano particles ($n_d$=2 or so), the refractive index of the light shielding layer is higher, and the refractive index difference between the light shielding layer and the air layer is larger. Therefore, it is considered that the diffuse reflected light on the surface of the light shielding layer increases. Moreover, the diffuse reflected light scatters through the concave and convex shape of the surface of the light shielding layer, and it becomes whitish, so it is speculated that it is difficult to obtain the blackness as the target in the present invention.

If the materials of low refractive index nano particles meet the above conditions, they can be inorganic materials or organic materials, or mixed materials or composites of organic materials and inorganic materials. The inorganic materials include, for example, chiolite ($Na_5Al_3F_{14}$, $n_d$=1.33); cryolite ($Na_3AlF_6$, ndd=1.35); fluorides such as sodium fluoride (NaF, $n_d$=1.34), lithium fluoride (LiF, $n_d$=1.36), aluminum fluoride ($AlF_3$, $n_d$=1.36), magnesium fluoride ($MgF_2$, $n_d$=1.38), calcium fluoride ($CaF_2$, $n_d$=1.43), barium fluoride ($BaF_2$, $n_d$=1.48); oxides such as silicon oxide (silicon dioxide: $SiO_2$, $n_d$=1.47); carbonates such as calcium carbonate ($CaCO_3$, $n_d$=1.50); etc.

In addition, the organic materials include, for example, nano particles (submicron particles) such as acrylic resin ($n_d$=1.49~1.50), styrene resin, silicone resin ($n_d$=1.43 or so), fluorine resin ($n_d$=1.35 or so). Further, it is possible to use an organic-inorganic hybrid material (organic-inorganic nano composite) obtained by compounding metal oxides and organic molecules.

From the point of view of chemical stability, magnesium fluoride, calcium fluoride, lithium fluoride, calcium carbonate, silicon oxide (silicon dioxide), etc. are preferred among the materials of the above-mentioned low refractive index nano particles.

In addition, as the low refractive index nano particles, nano hollow particles and nano clay particles and so on can also be used. In particular, by using nano hollow particles, the refractive index of the light shielding layer is further reduced, reducing the diffuse reflection, and therefore, the blackness can be greatly improved. Among these, hollow silica nano particles are further preferred.

In addition, plural kind of low refractive index nano particles with different compositions can also be used. Through these structures, the blackness can be further improved. For example, it is confirmed that by using magnesium fluoride nano particles and silicon dioxide nano particles together, the L value is reduced and the blackness is improved compared with the case where each composition is added separately. The reason for this phenomenon is not obvious. As one of the reasons, it is believed that: in the case of using plural kind of low refractive index nano particles with different compositions, compared with the case of a single use, it can inhibit the aggregation of low refractive index nano particles and form a low refractive index light shielding layer that is more uniformly dispersed by low refractive index nano particles. In addition, as other reasons, it is believed that: in the case of using plural kind of low refractive index nano particles with different compositions, on the one hand, it is easy to attach to the surfaces of black fine particles, mainly reducing the diffuse reflection of the surfaces of black fine particles; on the other hand, it is easy to uniformly disperse in the resin composition, reducing the diffuse reflection of the surface of the light shielding layer as the interface between the air layer and the light shielding layer. Through these synergistic effects, even better blackness is obtained.

With regard to the total content of black fine particles 32 and low refractive index nano particles 33 in the light shielding layer 3 of the black light shielding component 1 of the present invention, as long as the desired characteristics can be obtained, there is no special limit. However, compared with 100 volume % of the light shielding layer as a whole, it is preferably 50 volume % to 95 volume %, and more preferably 60 volume % to 90 volume %.

In addition, as long as the desired properties can be obtained, there is no special limit on the mixing ratio of black fine particles 32 and low refractive index nano particles 33. However, compared with the total amount of black fine particles 32 and low refractive index nano particles 33, low refractive index nano particles 33 are preferably 1 volume % to 50 volume %, more preferably 2 volume % to 25 volume %. By adjusting the content of black fine particles and low refractive index nano particles in the light shielding layer to the above range, more excellent low gloss and blackness can be obtained. In addition, through the above range, the interface between the substrate 2 and the light shielding layer 3, and the interface between the particles and the resin composition are fully bonded, so that excellent processability can be achieved during processing without stripping the light shielding layer.

In addition, the volume fraction (volume occupancy) of low refractive index nano particles in the light shielding layer can also be converted into the area occupancy calculated by image analysis and other methods based on the profile photos of the light shielding layer.

In the present invention, as the composition of the light shielding layer, leveling agent, tackifier, pH regulator, lubricant, dispersant, defoamer, etc. can be further added as required.

As the lubricant, the polytetrafluoroethylene (PTFE) particles as a solid lubricant, polyethylene wax, organic silicon particles, etc. can be used.

The above compositions are added to the organic solvent or water, and mixed and stirred to prepare a uniform coating solution. As an organic solvent, methyl ethyl ketone, toluene, propylene glycol monomethyl ether acetate, ethyl acetate, butyl acetate, methanol, ethanol, isopropanol, butanol, etc. can be used.

The obtained coating solution is directly coated on the surface of the substrate or the preformed fixed layer, and is dried to form a light shielding layer. There is no special limit on the coating methods, but a roller coating method, a doctor blade method, etc. can be used.

The thickness of the light shielding layer in the present invention is preferably 1 μm~100 μm, and more preferably 2 μm~50 μm, further preferably 3 μm~25 μm.

By setting the thickness of the light shielding layer to the above range, the desired blackness and anti reflection effect can be obtained. In addition, the thickness of the light shielding layer containing the matting agent is the height from the surface of the substrate to the matrix part where the black fine particles of the light shielding layer do not protrude. The thickness of the above light shielding layer can be measured according to JIS K7130.

Hereinafter, the characteristics of the black light shielding component of the present invention will be described.

(1) Glossiness

The glossiness of the surface of the black light shielding component of the present invention on which the light shielding layer is formed relative to an incident light with an incidence angle of 60° is preferably 11% or less, more preferably 0.8%, or less and further preferably 0.6% or less, most preferably 0.4% or less. By adjusting the glossiness of the black light shielding component of the present invention with respect to the incident light with an incidence angle of 60° to the above range, the flare ghost phenomenon caused by diffused reflection of light can be more effectively prevented.

The above glossiness can be obtained by measuring the specular glossiness with respect to the incidence angle of 60° according to JIS Z8741.

(2) Blackness

The L value of the surface on which the light shielding layer is formed of the black light shielding component of the present invention is preferably 10 or less, more preferably 8 or less, and further preferably 7 or less. By adjusting the L value of the black light shielding component of the present invention to the above range, the blackness is high, the black is prominent, and the design is excellent. Therefore, it can be used as a camera unit for mobile phones such as smart phones.

The L value is the L* value representing the lightness in the L*a*b* color space calculated according to JIS Z8781~4.

(3) Bonding Strength

The bonding strength of the black light shielding component of the present invention on the surface forming the light shielding layer is preferably 1N/25 mm or more, more preferably 2N/25 mm or more, further preferably 4N/25 mm or more, most preferably 6N/25 mm or more. By adjusting the bonding strength of the black light shielding component of the present invention to the above range, the light shielding layer film can be prevented from peeling during processing and the processability can be improved.

The adhesiveness is determined by measuring the resistance of 31B tape (manufactured by Nitto Electric Co., Ltd.)

pasted on the light shielding layer when peeling along the 180° direction according to JISZ0237. In addition, 31B tape can be attached to the light shielding layer with a 2 kg roller.

EXAMPLES

The present invention is further described in detail through the following examples, but the present invention is not limited to these examples. In addition, in the examples, "%" and "portion" represent % by mass and mass portion without special records.
(Compositions of Black Light Shielding Component)
(1) Substrate
    (1-1) Polyimide film: KAPTON 50MBC (thickness 12 μm), manufactured by Toray DuPont Co., Ltd
(2) Light Shielding Layer
(a) Particulates
    (a1) Acrylic filler (Acrylic resin fine particles): average particle size: 3 μm, refractive index: 1.49
    (a2) Porous carbon particles: average particle size: 3 μm, refractive index: about 1.55
    (a3) Carbon nanoparticles: average particle size: 128 nm, refractive index: 1.82
    (a4) Carbon nano particles: average particle size: 50 nm, refractive index: 1.80
    (a5) Acrylic copolymer fine particles (pigment coloring type): average particle size: 3 μm, refractive index: about 1.50
(b) Low Refractive Index Nano Particles
    (b1) Magnesium fluoride nano particles: average particle size: 50 nm, refractive index: about 1.38
    (b2) Hollow silica nano particles: average particle size: 60 nm, refractive index: about 1.30
    (b3) Silica nano particles: average particle size: 45 nm; refractive index: about 1.44
(c) Resin
    (c1) Acrylic resin: Acrydic A801, manufactured by DIC Co., Ltd
    (c2) Acrylic resin: PARACRON PRECOAT 200, manufactured by Negami Chemical Industry Co., Ltd
    (c3) Acrylic resin: PARACRON W197, manufactured by Negami Chemical Industry Co., Ltd
(d) Curing Agent
    (d1) Polyisocyanate: TAKENATE D110N, manufactured by Mitsui Chemical Co., Ltd

Examples 1 to 13, Comparison Examples 1 to 3, Reference Examples 1 to 2

According to the compounded ratio (mass of solid compositions) shown in Table 1~2, the compositions of the light shielding layer are put into the solvent, stirred and mixed to obtain the coating solution. Here, methyl ethyl ketone and toluene are used as solvents.

The coating solution of the compositions in Table 1 and Table 2 is coated on one surface of the substrate of the polyimide film, and then dried at 120° C. for 5 minutes to form a light shielding layer. In addition, the polyimide film is not provided with a fixed layer, and the surface of the substrate is directly coated with the coating solution.

By the above method, the average film thickness, glossiness with respect to the incident light with an incidence angle of 60°, L value and bonding strength of the obtained light shielding layer film are evaluated, and the results are shown in Table 1 and Table 2.

Figure 3A:
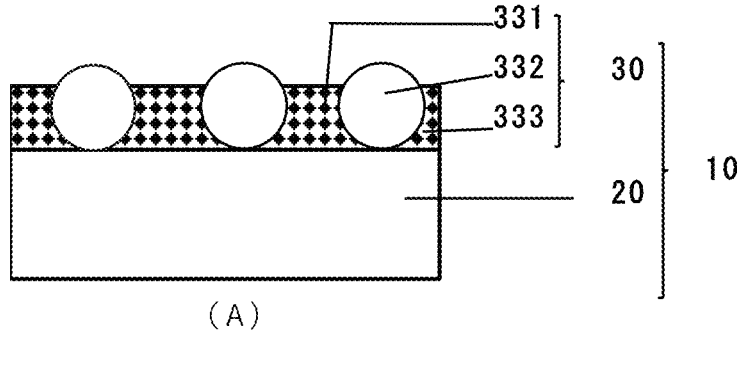
FIG. 3 is a sectional diagram showing the structures of the light shielding component (A) of reference example 1 and the light shielding component (B) of reference example 2.

As the reference example 1 of Table 1, it shows the evaluation results of the characteristics of the samples prepared with the compositions of the general conventional light shielding component. As shown in FIG. 3(A), the light shielding component 10 of reference example 1 has a structure in which the substrate 20 is covered with a light shielding layer 30 containing a resin composition 331, a matting agent 332, and a black pigment 333. In addition, in reference example 1, the matting agent 332 is acrylic resin particulates (colorless and transparent), and the black pigment 333 is carbon nano particles. It is considered that in such a previous light shielding component, light is scattered by the fine concave and convex shape of the surface of the light shielding layer 30 formed by the matting agent 332, and light is absorbed by the black pigment 333 dispersed in the resin composition 331 to reduce the reflected light, so that low gloss can be achieved.

However, in reference example 1, as shown in Table 1, it is confirmed that the bonding strength is good, at 10.7N/25 mm, but the glossiness at 60° is 2.7%, and the L value is high, at 23.0. Here, it is impossible to obtain the low gloss and blackness of the target level in the present invention. It is believed that this is because, in the light shielding layer of reference example 1, carbon nano particles are dispersed, so the refractive index is high. Through the difference between the refractive index of the light shielding layer 30 and the air layer, the diffuse reflected light on the surface of the light shielding layer 30 increases, and the diffuse reflected light scatters through the concave and convex shape of the surface, with whitish color.

TABLE 1

| | | | Example1 | Example2 | Example3 | Example4 | Example5 | Example6 | Comparison example1 | Comparison example2 | Reference example1 | Reference example2 |
|---|---|---|---|---|---|---|---|---|---|---|---|---|
| compositions | (a) Particulates | (a1)Acrylic resin fine particles (colorless transparent) | — | — | — | — | — | — | — | 100 | 96 | — |
| | | (a2)Porous carbon particles (black) | 100 | 100 | 100 | 100 | 100 | 100 | 100 | — | — | 200 |
| | | (a5) Acrylic copolymer fine particles (black) | — | — | — | — | — | — | — | — | — | — |
| | | (a3)Carbon nano particles | — | — | — | — | — | — | — | — | 114 | — |
| | | (a4)Carbon nano particles | — | — | — | — | — | — | 100 | — | — | — |
| | (b)Low refractive index nano | (b1)Magnesium fluoride nano particles | 100 | — | — | 50 | 50 | — | — | 100 | — | — |
| | | (b2)Hollow silica nano particles | — | 100 | — | 50 | — | 50 | — | — | — | — |

TABLE 1-continued

| | | Example1 | Example2 | Example3 | Example4 | Example5 | Example6 | Comparison example1 | Comparison example2 | Reference example1 | Reference example2 |
|---|---|---|---|---|---|---|---|---|---|---|---|
| particles | (b3)Silica nano particles | — | — | 100 | — | 50 | 50 | — | — | — | — |
| (c)Resin | (c1)Acrylic resin | — | — | — | — | — | — | — | — | 62 | — |
| | (c2)Acrylic resin | 100 | 100 | 100 | 100 | 100 | 100 | 100 | 100 | — | 100 |
| | (c3)Acrylic resin | — | — | — | — | — | — | — | — | — | — |
| (d)Curing agent | (d1)Isocyanate curing agent | — | — | — | — | — | — | — | — | 38 | — |
| | ((a) + (b))Volume occupancy relative to the overall light shielding layer (volume %) | 81 | 85 | 82 | 83 | 82 | 83 | 82 | 58 | 63 | 89 |
| | (b)Volume Occupancy of low refractive index nano particles relative to total particle amount (% by volume) | 9 | 27 | 10 | 19 | 9 | 20 | 0 | 28 | 0 | 0 |
| Evaluation results | Average film thickness(μm) | 10 | 13 | 10 | 12 | 11 | 12 | 12 | 11 | 5 | 11 |
| | Glossiness at 60°(%) | 0.1 | 0.1 | 0.1 | 0.1 | 0.1 | 0.1 | 0.1 | 1.2 | 2.7 | 0.1 |
| | Blackness L* | 7.2 | 6.3 | 7.3 | 5.4 | 6.3 | 6.7 | 18.1 | 24.4 | 23.0 | 8.7 |
| | Bonding strength(N/25 mm) | 3.4 | 5.9 | 5.9 | 6.2 | 6.7 | 5.5 | 4.8 | 0.2 | 10.7 | 0.1 |

Figure 3B:
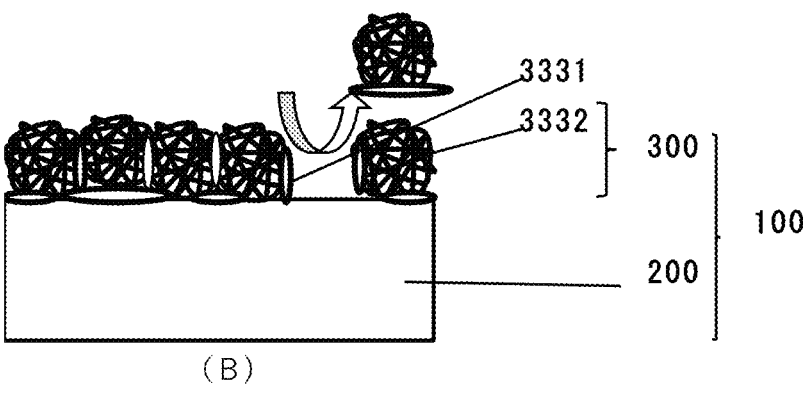

In reference example 2, it shows that the evaluation results of the characteristics of the sample prepared by adding porous carbon particles, which are black fine particles instead of acrylic resin fine particles (colorless and transparent), which are matting agent 332 for the purpose of reducing the L value, that is, improving the blackness. As shown in FIG. 3(B), the light shielding component 100 of reference example 2 has a structure in which a light shielding layer 300 containing a resin composition 3331 and black fine particles 3332 is formed on the substrate 200. It can be seen that in the light shielding component of reference example 2, the glossiness at 60° is 0.1%, achieving low gloss, and the L value is 8.7, which is greatly reduced compared with reference example 1, and can obtain blackness. However, the bonding strength is low, at which is predicted to hinder processing. It is believed that this is because, in reference example 2, as shown in FIG. 3(B), in order to reduce the L value to the desired value, the proportion of resin compositions in the light shielding layer 300 is reduced by increasing the amount of black fine particles 3332. Therefore, it is not possible to fully bond the substrate 200 to the light shielding layer 300 and the resin composition 3331 to the black fine particles 3332.

In comparison Example 1, which is obtained by changing ½ of the black fine particles in reference example 2 into carbon nano particles with an average particle size of 50 nm, it is confirmed that the glossiness at 60° is 0.1%, thus maintaining low gloss, while the bonding strength increased to 4.8N/25 mm. It is believed that this is because by changing a portion of the porous carbon into carbon nano particles, the volume proportion of resin composition in the light shielding layer is larger, and the substrate and particles can be fully bonded. However, in comparison example 1, it is known that the L value is 18.1, which is significantly higher than that in reference example 2, and the target level of blackness cannot be obtained. As a reason, it is believed that, in the light shielding layer where carbon nano particles with an average particle size of 50 nm and a refractive index of about 1.80 are dispersed, the refractive index rises, and the refractive index difference between the light shielding layer and the air layer is larger. Therefore, the diffuse reflected light on the surface of the light shielding layer is increased, and the diffuse reflected light is scattered through the concave and convex shape of the light shielding layer surface, with whitish color.

On the other hand, in comparison example 2, where transparent acrylic resin fine particles and magnesium fluoride nano particles having low refractive index are added, it can be seen that the glossiness at 60° is 1.2%, and the L value is 24.4, so the low gloss and blackness as the target cannot be obtained. Furthermore, it is confirmed that the bonding strength is 0.2N/25 mm, and the adhesiveness is insufficient.

In contrast, in the examples of the present invention in which magnesium fluoride nano particles (refractive index: 1.38) (example 1), hollow silica nano particles (refractive index: 1.30) (example 2), and silica nano particles (refractive index: 1.44) (example 3) as low refractive index nanoparticles are added with black fine particles, it is confirmed that the glossiness at 60° is 0.1%, which is low gloss, the L value is 8 or less, and has excellent blackness. It is believed that this is because, by dispersing low refractive index nano particles in the light shielding layer, the refractive index of the light shielding layer is reduced, and the refractive index difference between the light shielding layer and the air layer is reduced, thus reducing the diffuse reflected light on the surface of the light shielding layer, and then the diffuse reflected light is absorbed and reflected by the black fine particles, and the light is significantly attenuated. In addition, it is confirmed that in all examples of the present invention containing black fine particles and low refractive index nano particles, the bonding strength is 3N/25 mm or more, and the adhesiveness is also good.

In examples 1 to 3, especially in example 2 where hollow silica with a refractive index of 1.30 is used, it is also confirmed that the L value is reduced to 6.3, excellent blackness is obtained, and the bonding strength is also high, 5.9N/25 mm. It is believed that this is because, since the refractive index of hollow silica nano particles is low, the refractive index of the light shielding layer is further reduced, and the difference of the refractive index between the light shielding layer and the air layer is reduced. Therefore, the diffuse reflection of light on the surface of the light shielding layer is further reduced.

In addition, in the present examples, it is believed that since porous carbon is used as the black fine particles, light is reflected and absorbed between the porous carbon particles, and light is also reflected and absorbed repeatedly in the porous carbon particles (in the holes), so that the light is significantly attenuated and the blackness is further improved.

In addition, in example 4 (magnesium fluoride nano particles and hollow silica nano particles), example 5 (magnesium fluoride nano particles and silica nano particles), and example 6 (hollow silica nano particles and silica nano particles), in which two kinds of low refractive index nano particles are added, it is confirmed that they have low gloss, excellent blackness and adhesiveness.

In particular, in example 4, in which magnesium fluoride nano particles and hollow silica nano particles are added, the L value is 5.4, which is lower than either of example 1 in which magnesium fluoride nano particles are used separately or example 2 in which hollow silica nano particles are used separately, confirming the effect of using plural kind of low refractive index nano particles with different refractive indexes. Compared with example 1 using magnesium fluoride nano particles separately and example 2 using hollow silica nano particles separately, in example 4, which adding magnesium fluoride nano particles and hollow silica nano particles, it also improves adhesion.

In addition, it can be seen that in example 5 with magnesium fluoride nano particles and silica nano particles added, the L value is also lower than either example 1 with magnesium fluoride nano particles separately or example 3 with silica nano particles separately obtaining the equivalent blackness as example 2 with hollow silica nano particles added. Further, in example 5, the bonding strength is higher than either of example 1 or example 3, and the bonding property is improved compared with example 2. Therefore, it is confirmed that low gloss, excellent blackness and adhesiveness can be achieved without using expensive hollow silica nano particles by combining magnesium fluoride nano particles and silica nano particles.

The reasons for reducing the L value by using the plural of low refractive index nano particles with different composition and refractive index are unclear, but it is believed that the reasons are as follows. As one of the reasons, it can be cited that: by using different kinds of low refractive index nano particles, compared with the case of using one kind, a low refractive index light shielding layer is formed to prevent the aggregation of low refractive index nano particles, and the low refractive index nano particles are more evenly dispersed. In addition, for other reasons, it is believed that when the plural of low refractive index nano particles with different compositions are used, some low refractive index nano particles are easily attached to the surfaces of black particles, and on the other hand, others are easily and uniformly dispersed in the resin composition. For example, in example 5, which combines magnesium fluoride nano particles and silica nano particles, it is believed that magnesium fluoride nano particles are easy to attach to the surfaces of black fine particles, reducing the diffuse reflection of the surfaces of black fine particles, and silica nano particles are dispersed in the resin composition, reducing the diffuse reflection of the resin surface, which is the interface between the air layer and the light shielding layer, and further excellent blackness is obtained through the synergistic effect of the two.

In examples 7, 5 and 8 of Table 2, the samples are prepared by setting the addition amount of black fine particles and resin composition to a certain value and changing the addition amount of low refractive index nano particles. Here, as low refractive index nano particles, magnesium fluoride nano particles and silica nano particles are used, and their mass ratio is set to 1:1. In examples 7, 5 and 8, the glossiness at 60° is 0.1, and low glossiness is obtained.

In addition, in example 5, in which 50 mass portions of magnesium fluoride nano particles and silica nano particles are added respectively, the L value is 6.3. In contrast, the L values of example 7 with 25 mass portions of magnesium fluoride nano particles and silica nano particles respectively added, and example 8 with 100 mass portions of magnesium fluoride nano particles and silica nano particles respectively added are 8.5 and 7.8, which are higher than example 5.

In example 7, it is considered that the refractive index of the light shielding layer is higher, the diffuse reflected light increases, and the L value is higher because the compounded amount of low refractive index nano particles is reduced. On the other hand, in example 8, it is believed that by increasing the compounded amount of low refractive index nano particles, the compounded ratio of black fine particles in the light shielding layer is reduced, so the reflection and absorption of diffuse reflected light are suppressed, and the L value is higher.

In addition, it can be seen that the bonding strength increases in sequence according to examples 7, 5 and 8. When the amount of black fine particles in the light shielding layer is set to a certain value, the bonding strength of the light shielding layer is improved by increasing the compounded amount of low refractive index nano particles. It is believed that this is because the binder resin is strong and tough by combining with low refractive index nano particles.

It can be seen from the above results that it is effective to adjust the content of low refractive index nano particles in the light shielding layer in order to obtain the desired blackness and adhesiveness.

Examples 9, 5 and 10 in Table 2 show the evaluation results of glossiness, L value and bonding strength when the total amount of magnesium fluoride nano particles and silica nano particles is set to a certain value and the ratio of magnesium fluoride nano particles to silica nano particles is changed. For comparison, the results of examples 1 and 3 obtained by separately adding magnesium fluoride nano particles and silica nano particles are also shown.

It can be seen that compared with examples 1 and 3 obtained by adding magnesium fluoride nano particles and silica nano particles separately, in examples 9, 5 and 10 with magnesium fluoride nano particles and silica nano particles added, the L value is reduced and the adhesion is improved. Where the total amount of magnesium fluoride nano particles and silica nano particles is set to 100, the ratio of magnesium fluoride nano particles is set to 25% by mass in example 9, the ratio of magnesium fluoride nano particles is set to 50% by mass in example 5, and in the ratio of magnesium fluoride nano particles is set to 75% by mass in example 10, there is no significant difference in L values. The following possibilities are considered: in the case of using magnesium fluoride nano particles separately, due to the aggregation of magnesium fluoride nano particles, there is a portion with uneven refractive index in the light shielding layer. However, by adding silica nano particles, the aggregation of magnesium fluoride particles is relieved, and a low refractive index light shielding layer with low refractive index nano particles uniformly dispersed in the light shielding layer is formed, which further reduces the diffuse reflected light and further improves the blackness.

In addition, in examples 9, 5 and 10 containing magnesium fluoride nano particles and silica nano particles, the following possibilities are considered: magnesium fluoride nano particles are attached to the surface of the black fine particles, reducing the diffuse reflection of the surfaces of the black fine particles, and silica nano particles are dispersed in the resin composition, reducing the diffuse reflection of the surface of the binder resin of the light shielding layer, which is the interface between the air layer and the light shielding layer, and the further excellent blackness is obtained by the synergistic effects of the two.

Examples 11, 5 and 12 in Table 2 show the evaluation results of glossiness, L value and bonding strength when the ratio of porous carbon, magnesium fluoride nano particles and silica nano particles is set to a certain value, and the total content of the above particles relative to the light shielding layer is changed. In either example, it is confirmed that the glossiness of 60° is 0.1%, and low glossiness is obtained. In addition, in example 11, where the content of particles relative to the light shielding layer is 69 volume %, it is confirmed that the L value is 8.7, and the bonding strength is 11.8N/25 mm, with good blackness and excellent adhesiveness. In example 5, where the particle content is set to 82 volume %, the L value is reduced to 6.3 and the bonding strength is reduced to 6.7N/25 mm. Further, in example 12, where the particle content is set to 85 volume %, the L value is 6.4, which is equivalent as example 5, but the bonding strength is reduced to 2.1N/25 mm.

It can be seen from the above results that in order to obtain the desired blackness and adhesiveness, it is effective to adjust the total amount of black fine particles and low refractive index nano particles in the light shielding layer.

Similarly, the evaluation results of comparison example 3 are shown in Table 2. In comparison example 3, black particles, acrylic resin particles colored black are used to replace porous carbon and are dispersed together with carbon nano particles in the resin layer. In comparison example 3, the glossiness at 60° is 0.2%, and the bonding strength is 9.8N/25 mm, obtaining sufficient low gloss and bonding strength. However, the L value is 13.6, and the target blackness cannot be obtained. It is believed that this is due to the high refractive index and more diffuse reflection on the surface of the light shielding layer in which carbon nano particles are dispersed.

Similarly, the results of example 13 are shown in Table 2, example 13 uses magnesium fluoride nano particles and silica nano particles as low refractive index nano particles, and acrylic resin fine particles colored black. In example 13, the glossiness at 60° is 0.1%, the L value is 9.7, and the bonding strength is 10.1N/25 mm. It is thus confirmed that the use of acrylic resin particles colored black as black fine particles can also obtain the effects of the present invention, namely, low gloss, excellent blackness and adhesion.

TABLE 2

| | | | Example7 | Example5 | Example8 | Example1 | Example9 | Example5 | Example10 |
|---|---|---|---|---|---|---|---|---|---|
| compositions | (a)Particulates | (a1)Acrylic resin fine particles (colorless transparent) | — | — | — | — | — | — | — |
| | | (a2)Porous carbon particles (black) | 100 | 100 | 100 | 100 | 100 | 100 | 100 |
| | | (a5) Acrylic copolymer fine particles (black) | — | — | — | — | — | — | — |
| | | (a3)Carbon nano particles | — | — | — | — | — | — | — |
| | | (a4)Carbon nano particles | — | — | — | — | — | — | — |
| | (b)Low refractive index nano particles | (b1)Magnesium fluoride nano particles | 12.5 | 50 | 100 | 100 | 75 | 50 | 25 |
| | | (b2)Hollow silica nano particles | — | — | — | — | — | — | — |
| | | (b3)Silica nano particles | 12.5 | 50 | 100 | — | 25 | 50 | 75 |
| | (c)Resin | (c1)Acrylic resin | — | — | — | — | — | — | — |
| | | (c2)Acrylic resin | 100 | 100 | 100 | 100 | 100 | 100 | 100 |
| | | (c3)Acrylic resin | — | — | — | — | — | — | — |
| | (d)Curing agent | (d1)Isocyanate curing agent | — | — | — | — | — | — | — |
| | ((a) + (b))Volume occupancy relative to the overall light shielding layer (volume %) | | 80 | 82 | 83 | 81 | 81 | 82 | 82 |
| | (b)Volume Occupancy of low refractive index nano particles relative to total particle amount (% by volume) | | 3 | 9 | 17 | 9 | 9 | 9 | 10 |
| Evaluation | Average film thickness(μm) | | 10 | 11 | 10 | 10 | 10 | 11 | 10 |
| | Glossiness at 60°(%) | | 0.1 | 0.1 | 0.1 | 0.1 | 0.1 | 0.1 | 0.1 |
| | Blackness L* | | 8.5 | 6.3 | 7.8 | 7.2 | 6.6 | 6.3 | 6.5 |
| | Bonding strength(N/25 mm) | | 3.6 | 6.7 | 7.4 | 3.4 | 6.1 | 6.7 | 7.1 |

| | | | Example3 | Example11 | Example5 | Example12 | Example13 | Comparison example3 |
|---|---|---|---|---|---|---|---|---|
| compositions | (a)Particulates | (a1)Acrylic resin fine particles (colorless transparent) | — | — | — | — | — | — |
| | | (a2)Porous carbon particles (black) | 100 | 50 | 100 | 125 | — | — |
| | | (a5) Acrylic copolymer fine particles (black) | — | — | — | — | 500 | 500 |
| | | (a3)Carbon nano particles | — | — | — | — | — | 25 |
| | | (a4)Carbon nano particles | — | — | — | — | — | — |
| | (b)Low refractive index nano particles | (b1)Magnesium fluoride nano particles | — | 25 | 50 | 62.5 | 25 | — |

TABLE 2-continued

| | | | | | | | | |
|---|---|---|---|---|---|---|---|---|
| | | (b2)Hollow silica nano particles | — | — | — | — | — | — |
| | | (b3)Silica nano particles | 100 | 25 | 50 | 62.5 | 100 | — |
| | (c)Resin | (c1)Acrylic resin | — | — | — | — | — | — |
| | | (c2)Acrylic resin | 100 | 100 | 100 | 100 | — | — |
| | | (c3)Acrylic resin | — | — | — | — | 90 | 90 |
| | (d)Curing agent | (d1)Isocyanate curing agent | — | — | — | — | 10 | 10 |
| | ((a) + (b))Volume occupancy relative to the overall light shielding layer (volume %) | | 82 | 69 | 82 | 85 | 85 | 84 |
| | (b)Volume Occupancy of low refractive index nano particles relative to total particle amount (% by volume) | | 10 | 9 | 9 | 9 | 10 | — |
| Evaluation | Average film thickness(μm) | | 10 | 12 | 11 | 12 | 12 | 11 |
| | Glossiness at 60°(%) | | 0.1 | 0.1 | 0.1 | 0.1 | 0.1 | 0.2 |
| | Blackness L* | | 7.3 | 8.7 | 6.3 | 6.4 | 9.7 | 13.6 |
| | Bonding strength(N/25 mm) | | 5.9 | 11.8 | 6.7 | 2.1 | 10.1 | 9.8 |

| Label description: | |
|---|---|
| 1, 10, 100 | light shielding component |
| 2, 20, 200 | substrate |
| 3, 30, 300 | light shielding layer |
| 31, 331, 3331 | resin composition |
| 32, 3332 | black fine particles |
| 33 | low refractive index nano particles |
| 332 | matting agent |
| 333 | black pigment |

The invention claimed is:

1. A black light shielding component, comprising a substrate and a light shielding layer formed on at least one surface of the substrate directly or via an anchor layer configured to improve adhesion therebetween, wherein the light shielding layer comprises black fine particles, low refractive index nano particles and resin compositions, the low refractive index nano particles contain at least two selected from magnesium fluoride particles, calcium fluoride particles, lithium fluoride particles, calcium carbonate particles, and silicon oxide particles, the sum of the contents of the black fine particles and low refractive index nano particles in the light shielding layer is 50%~95% relative to the overall volume of the light shielding layer, and the glossiness of the surface of the black light shielding component on which the light shielding layer is formed relative to the incident light with an incidence angle of 60° is 1% or less, and the L value is 10 or less.

2. The black light shielding component according to claim 1, wherein the black fine particles contain porous carbon.

3. The black light shielding component according to claim 1, wherein the low refractive index nano particles contain magnesium fluoride particles and silicon oxide particles.

4. The black light shielding component according to claim 1, wherein the low refractive index nano particles contain hollow nano particles.

5. The black light shielding component according to claim 4, wherein the hollow nano particles contain hollow silica nano particles.

6. The black light shielding component according to claim 1, wherein the average particle size of the black fine particles is 0.1 μm~50 μm, the average particle size of the low refractive index nano particles is 1 nm~200 nm, and the content of the low refractive index nano particles is 1 volume % to 50 volume % relative to the total amount of the black fine particles and the low refractive index nano particles.

7. The black light shielding component according to claim 1, wherein the average film thickness of the light shielding layer is 1 μm~100 μm.

* * * * *